US010390184B2

(12) United States Patent
Lakshmi Narayanan et al.

(10) Patent No.: US 10,390,184 B2
(45) Date of Patent: Aug. 20, 2019

(54) POSITION DETERMINATION OF NETWORK ELEMENTS AND USER EQUIPMENT IN INDOOR ENVIRONMENT

(71) Applicant: NOKIA SOLUTIONS AND NETWORKS OY, Espoo (FI)

(72) Inventors: Ram Lakshmi Narayanan, Pleasanton, CA (US); Somasundaram Velayutham, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/503,165

(22) PCT Filed: Aug. 12, 2014

(86) PCT No.: PCT/EP2014/067191
§ 371 (c)(1),
(2) Date: Feb. 10, 2017

(87) PCT Pub. No.: WO2016/023576
PCT Pub. Date: Feb. 18, 2016

(65) Prior Publication Data
US 2017/0230802 A1 Aug. 10, 2017

(51) Int. Cl.
*H04W 4/33* (2018.01)
*H04W 4/04* (2009.01)
(Continued)

(52) U.S. Cl.
CPC .............. *H04W 4/043* (2013.01); *G01C 5/00* (2013.01); *G01S 5/0027* (2013.01);
(Continued)

(58) Field of Classification Search
CPC ..... H04W 4/043; H04W 24/08; H04W 24/10; H04W 4/023; H04W 4/027; H04W 4/04;
(Continued)

(56) References Cited

U.S. PATENT DOCUMENTS 7,821,986 B2 * 10/2010 Thomson ............. G01C 21/206
370/328
9,116,230 B2 * 8/2015 Vartanian ................ G01S 15/08
(Continued)

FOREIGN PATENT DOCUMENTS

CN 101512376 A 8/2009
CN 103189717 A 7/2013
(Continued)

OTHER PUBLICATIONS

3GPP TR 22.803 V12.2.0 (Jun. 2013); 3rd Generation Partnership Project; Technical Specification Group Services and System Aspects; Feasibility study for Proximity Services (ProSe) (Release 12).
(Continued)

*Primary Examiner* — Meless N Zewdu
(74) *Attorney, Agent, or Firm* — Squire Patton Boggs (US) LLP

(57) ABSTRACT

Determination of the position of devices may be useful in various communication systems. For example, wireless communication systems that support emergency services may benefit from being able to make a vertical position determination of user equipment and/or network elements within a building or in other indoor environments, such as caves. A method can be implemented by a processor of a base station. The method can include receiving from at least one user equipment, at least one report based on at least a signal strength of a wireless connection between the at least one user equipment and the base station. The method can also include determining a vertical position of the base station, from the at least one report.

20 Claims, 10 Drawing Sheets

(51) Int. Cl.

| | |
|---|---|
| *G01C 5/00* | (2006.01) |
| *G01S 19/49* | (2010.01) |
| *G01S 5/00* | (2006.01) |
| *H04W 64/00* | (2009.01) |
| *G01S 5/02* | (2010.01) |
| *H04W 4/02* | (2018.01) |
| *H04W 24/08* | (2009.01) |
| *H04W 24/10* | (2009.01) |
| *H04W 24/02* | (2009.01) |

(52) U.S. Cl.
CPC ............ *G01S 5/0289* (2013.01); *G01S 19/49* (2013.01); *H04W 4/023* (2013.01); *H04W 4/027* (2013.01); *H04W 24/02* (2013.01); *H04W 24/08* (2013.01); *H04W 24/10* (2013.01); *H04W 64/003* (2013.01); *H04W 64/00* (2013.01)

(58) Field of Classification Search
CPC ....... H04W 4/02; H04W 16/20; H04W 16/22; H04W 16/225; H04W 16/24; H04W 16/18; H04W 16/26; H04W 40/205; H04W 4/025; H04W 40/20; H04W 4/021; H04W 4/024; H04W 4/33; H04W 84/045; H04W 84/105; H04W 64/00; H04W 64/003; H04N 21/43637; H04B 10/1143; H04B 10/1129; H04B 10/114; H04B 10/1149
See application file for complete search history.

(56) References Cited

U.S. PATENT DOCUMENTS

| | | | | |
|---|---|---|---|---|
| 9,462,424 | B2* | 10/2016 | Luo et al. ............ | H04W 4/043 |
| 9,973,900 | B2* | 5/2018 | Bailiang et al. ...... | H04W 4/043 |
| 2011/0250903 | A1* | 10/2011 | Huang .................. | G01S 5/0263 455/456.1 |
| 2011/0281526 | A1* | 11/2011 | Matsuda ............... | H04W 16/18 455/67.11 |
| 2012/0072106 | A1* | 3/2012 | Han ...................... | G01S 5/0252 701/410 |
| 2012/0072110 | A1* | 3/2012 | Venkatraman ........... | G01C 5/06 701/434 |
| 2012/0309408 | A1* | 12/2012 | Marti ..................... | G01S 5/0027 455/456.1 |
| 2013/0307696 | A1* | 11/2013 | Booij ..................... | A61B 5/1113 340/686.6 |
| 2013/0331120 | A1* | 12/2013 | Ranki ....................... | G01S 3/14 455/456.1 |
| 2014/0002307 | A1* | 1/2014 | Mole ..................... | G01S 5/0263 342/451 |
| 2014/0004876 | A1* | 1/2014 | Fuller ................... | G01C 21/206 455/456.1 |
| 2014/0114568 | A1* | 4/2014 | Park ....................... | G01S 5/0263 701/469 |
| 2014/0228058 | A1* | 8/2014 | Ji .......................... | G01S 5/0252 455/456.5 |
| 2014/0235266 | A1* | 8/2014 | Edge ..................... | H04W 64/00 455/456.1 |
| 2015/0024774 | A1* | 1/2015 | Ostergaard .............. | H04L 41/12 455/456.1 |
| 2015/0052460 | A1* | 2/2015 | Mohammad Mirzaei .................. | G06F 3/0484 715/764 |
| 2015/0249907 | A1* | 9/2015 | Gupta ................... | H04W 4/043 455/456.1 |
| 2015/0341233 | A1* | 11/2015 | Marri Sridhar ....... | G01S 5/0252 370/252 |
| 2015/0341753 | A1* | 11/2015 | Chen ...................... | H04W 4/04 455/456.1 |
| 2016/0192157 | A1* | 6/2016 | Wirola et al. ......... | H04W 4/043 |
| 2016/0337888 | A1* | 11/2016 | Zhang et al. ......... | H04W 24/08 |
| 2016/0381513 | A1* | 12/2016 | Luo ....................... | G01S 5/0252 455/456.1 |

FOREIGN PATENT DOCUMENTS

| | | |
|---|---|---|
| CN | 103931248 A | 7/2014 |
| KR | 10-1344408 B1 | 12/2013 |
| WO | 2008/035139 A1 | 3/2008 |
| WO | 2013/003277 A1 | 1/2013 |

OTHER PUBLICATIONS

3GPP TS 22.468 V12.0.0 (Jun. 2013); 3rd Generation Partnership Project; Technical Specification Group Services and System Aspects; Group Communication System Enablers for LTE (GCSE_LTE) (Release 12).

Wan Bejuri et al; Ubiquitous Positioning: A Taxonomy for Location Determination on Mobile Navigation System; Signal & Image Processing : An International Journal(SIPIJ) vol. 2, No. 1, Mar. 2011; ResearchGate.

Christopher Jekeli; Inertial Navigation Systems with Geodetic Applications; Walter de Gruyter; New York, 2001.

Hui Liu, et al; Survey of Wireless Indoor Positioning Techniques and Systems; IEEE Transactions on Systems, Man, and Cybernetics—Part C: Applications and Reviews, vol. 37, No. 6, Nov. 2007; pp. 1067-1080.

Mikkel Baum Kjaergaard; A Taxonomy for Radio Location Fingerprinting; Location- and Context-Awareness lecture Notes in Computer Science vol. 4718, 2007, pp. 139-156, Springer-Verlag.

Dr. Rainer Mautz; Indoor Positioning Technologies; Thesis; Feb. 2012; http://e-collection.library.ethz.ch/eserv/eth:5659/eth-5659-01.pdf.

Imad Afyouni et al; Spatial models for context-aware indoor navigation systems: A survey; Journal of Spatial Information Service, No. 4 (2012); pp. 85-123.

Overview of 3GPP Release 12 v0.1.1 (Dec. 2013).

NextNav Elevation System; Dec. 27, 2012; http://www.comsocscv.org/docs/tom_wolf_111412.pdf.

Adena Schutzberg; Ten Thins You Need to Know About Indoor Positioning; May 6, 2013; http://www.directionsmag.com/articles/10-things-you-need-to-know-about-indoor-positioning/324602.

About InLocatin Alliance: In Location Alliance; http://inlocationalliance.org/about/.

Qualcomm Expands Market-Leading IZat Location Platform to Enable Indoor Positioning Experiences for Consumers, Revenue Opportunities for Business; Nov. 15, 2012; https://www.qualcomm.com/news/releases/2012/11/15/qualcomm-expands-market-leading-izat-location-platform-enable-indoor.

FFC—Proposes new indoor requirements and revisions to existing E911 rules; http://www.fcc.gov/document/proposes-new-indoor-requirements-and-revisions-existing-e911-rules; Federal Communication Commission FFC 14-13.

International Search Report and Written Opinion dated Apr. 13, 2015 corresponding to International Patent Application No. PCT/EP2014/067191.

Notice to File a Response Office Action dated Jun. 28, 2018 corresponding to Korean Patent Application No. 10-2017-7006517.

Hiroshi Mizuno et al., "Indoor-Outdoor Positioning and Lifelog Experiment with Mobile Phones," dated Nov. 15, 2007, pp. 55-57.

"So, Um, Why Does the New Google Phone Have a Barometer in it?," Popular Science, dated Oct. 19, 2011, downloaded from http://www.popscience.com/gadgets/article/2011-10/so-um-why-does-new-google-phone-have-barometer-it, pp. 1-4.

"Indoor Positioning System based on Gyroscope and Accelerometer," Stack Overflow, dated Sep. 21, 2011, downloaded from http://stackoverflow.com/questions/7499959/indoor-positioning-system-based-on-gyroscope-and-accelerometer?answertab=oldest#tab-top, pp. 1-8.

(56) References Cited

OTHER PUBLICATIONS

First Office Action dated Jul. 19, 2018 corresponding to Chinese Patent Application No. 201480082647.1, and English translation thereof.
A. Kupper, "Location-based Services—Fundamentals and Operation." John Wiley & Sons, Chichester (2005), chapters 1-13, 358 pages.
Second Office Action dated Apr. 3, 2019 corresponding to Chinese Patent Application No. 201480082647.1, and English translation thereof.

* cited by examiner

| S.No | Cell Information | Signal (or Wireless Parameters) | X (Computed Relative) | Y (Computed Relative) | Z (Pressure Value) |
|---|---|---|---|---|---|
| 1 | S1 | UE11 (v1) | X1 | Y1 | Z1 |
| 2 | S2 | UE11 (v2) | X1 | Y1 | Z1 |
| 3 | S3 | UE11(v3) | X1 | Y1 | Z1 |
| 4 | S1 | UE12(v4) | X2 | Y2 | Z1 |
| 5 | S2 | UE12(v5) | X2 | Y2 | Z1 |
| 6 | S3 | UE12(v6) | X2 | Y2 | Z1 |
| 7 | S1 | UE13(v7) | X3 | Y3 | Z1 |
| 8 | S2 | UE13(v8) | X3 | Y3 | Z1 |
| 9 | S3 | UE13(v9) | X3 | Y3 | Z1 |
| 10 | S1 | UE21(v10) | X4 | Y4 | Z2 |
| 11 | S2 | UE21(v11) | X4 | Y4 | Z2 |
| 12 | S3 | UE21(v12) | X4 | Y4 | Z2 |

Figure 4

POSITION DETERMINATION OF NETWORK ELEMENTS AND USER EQUIPMENT IN INDOOR ENVIRONMENT

BACKGROUND

Field

Determination of the position of devices may be useful in various communication systems. For example, wireless communication systems that support emergency services may benefit from being able to make a vertical position determination of user equipment (UE) and/or network elements within a building or in other indoor environments, such as caves.

Description of the Related Art

In a mobile environment, locating the user can be essential to deliver emergency and to deliver location based services. Global positioning system (GPS) has become a default mechanism to determine the location of systems. The accuracy and precisions of GPS may be adequate for outdoor environments. Now that more small cell base stations are getting deployed, indoor based location systems may need to be considered. Due to its operating frequency, GPS does not work with the same accuracy indoors. Existing systems, despite their complexity, suffer from multipath propagation and are limited to x and y axis information.

The Federal Communications Commission (FCC) has released a request to have indoor position systems. According to this request, providers would be required to provide horizontal location information within 50 meters of the caller for 67 percent of 911 calls placed from indoor environments within two years of the effective date of adoption of rules, and for 80 percent of indoor calls within five years. Horizontal position can refer to x and y axis position. Additionally, providers would be required to provide vertical location information within 3 meters of the caller for 67 percent of indoor 911 calls within three years, and for 80 percent of calls within five years. Vertical position can refer to z axis information.

There may be various reasons for wanting vertical position in addition to horizontal position. In a large building, emergency responders may need to know which floor a person is on, not just the horizontal location. While 10 meter accuracy horizontally can get a responder to within shouting distance horizontally, 10 meters is about 3 floors vertically. Even if the users are on an adjacent floor that is less than 5 to 10 meters, they may be unreachable by shouting. The construction of ceiling and separation can make such attempts difficult. Thus, an order of magnitude greater accuracy may be needed in the vertical dimension to put the responder within shouting distance.

Most conventional radio-based location technologies have poor geometry for providing the vertical position indoors, and consequently lack the accuracy to achieve a shouting distance level of accuracy. Indoors, GPS may not work with accuracy, due to characteristics such as multipath.

Alternatives to GPS for indoor position systems typically use some form of local map, and superimpose the user's movements on the map. The map, however, only gives x and y axis direction and not z axis.

BRIEF DESCRIPTION OF THE DRAWINGS

For proper understanding of the invention, reference should be made to the accompanying drawings, wherein:

FIG. 4 provides an example of a table of data obtained at a network element, according to certain example embodiments.

DETAILED DESCRIPTION

Figure 1:
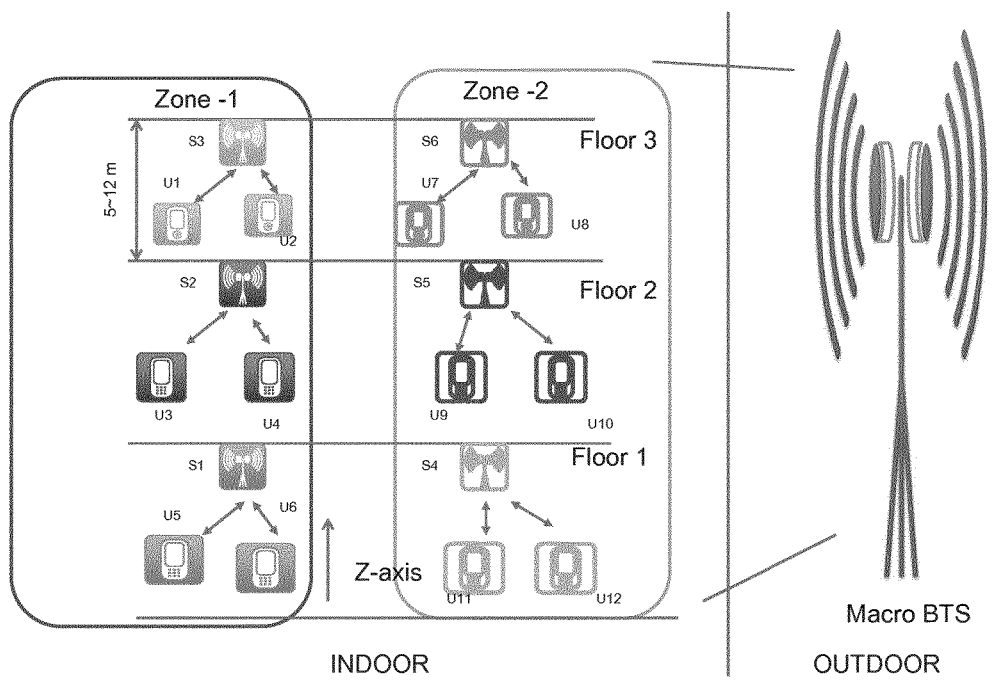
FIG. 1 illustrates a network architecture according to certain example embodiments.

Certain example embodiments provide alternative approach for indoor systems to determine x, y and z axis information. For example, certain example embodiments can provide alternate technology to augment the vertical component of the solution.

As described above, in some indoor environments, the building structures are tall. Thus, certain example embodiments may need to determine the height of the base station (BTS), also known as its z axis information. This useful information is not traditionally available with the BTS. Indeed, current technologies are not capable of providing the z axis information.

Various indoor location systems rely on a probabilistic approach. By contrast, certain example embodiments rely on a deterministic approach. Furthermore, certain example embodiments are designed to work in seamless environment.

More particularly, certain example embodiments provide a system to determine z axis floor level information in an indoor environment. Furthermore, certain example embodiments provide a system that can work with existing systems and architecture. Additionally, certain example embodiments provide a system that can work seamlessly in existing radio conditions. Moreover, certain example embodiments provide a system that can provide assistance for self-organized networks (SON), emergency service and other applications seamless for proper operations.

In certain example embodiments, a system or method can automatically generate or declares the location of the infrastructure wireless equipment installed in a building. The infrastructure in question can be, for example, small cell base stations deployed inside the building. Such determination of z axis information for the network element may be useful for providing services such as traffic steering and indoor radio coverage, and can also provide emergency service with higher accuracy.

A small cell base station, which can also be referred to as a small cell, can be defined as a low powered base station that can wirelessly communicate with nearby user equipment, such as for example a smart phone, tablet, laptop computer, or other mobile computing device. Nearby user equipment here can refer to user equipment are within a range of 10 meters to 1 or 2 kilometers. By contrast macro base stations, which can also be called macrocells, can be high-powered base stations that can wirelessly communicate with user equipment that are within a range of a few tens of kilometers.

Certain example embodiments provide a mechanism to learn z axis information in an indoor system using a network based solution. Moreover, certain example embodiments provide a mechanism in which a BTS can learn its own z axis information in an indoor environment. Certain example embodiments, for example, provide a bootstrapping procedure that can be used after starting the starting the BTS. Additionally, certain example embodiments utilize a specific protocol to derive location of the BTS As mentioned above, in certain example embodiments a mechanism can be provided to provide for indoor location position for network equipment. The network equipment can include, for example, small BTS or sensors that are permanent or semi-permanent in the environment.

The approach of certain mechanisms can be network based and can be independent of any particular wireless technologies. For example, certain example embodiments may be usable with Wi-Fi, Bluetooth, and licensed spectrum such as 3G, 4G, and beyond.

According to certain example embodiments, a method can be implemented by a processor of a base station. The method can include receiving from at least one user equipment, at least one report based on at least a signal strength of a wireless connection between the at least one user equipment and the base station. The method can also include determining a vertical position of the base station, from the at least one report.

In certain example embodiments a method can be implemented by a processor of a user equipment. The method can include initiating relative movement detection. The method can also include reporting, to a base station, a location of the user equipment, based on the relative movement detection, for determination of a location of the base station.

A non-transitory computer-readable medium can be encoded with instructions that, when executed in hardware, perform a process corresponding to either of the above-described methods.

A computer program product can encode instructions for performing a process corresponding to either of the above-described methods.

An apparatus, according to certain example embodiments, can include at least one processor and at least one memory including computer program code. The at least one memory and the computer program code can be configured to, with the at least one processor, cause a base station at least to receive from at least one user equipment, at least one report based on at least a signal strength of a wireless connection between the at least one user equipment and the base station. The at least one memory and the computer program code can also be configured to, with the at least one processor, cause a base station at least to determine a vertical position of the base station, from the at least one report.

An apparatus, in certain example embodiments, can include at least one processor and at least one memory including computer program code. The at least one memory and the computer program code can be configured to, with the at least one processor, cause a user equipment at least to initiate relative movement detection. The at least one memory and the computer program code can also be configured to, with the at least one processor, cause a user equipment at least to report, to a base station, a location of the user equipment, based on the relative movement detection, for determination of a location of the base station.

According to certain example embodiments, an apparatus can include means for receiving from at least one user equipment, at least one report based on at least a signal strength of a wireless connection between the at least one user equipment and the base station. The apparatus can also include means for determining a vertical position of the base station, from the at least one report.

In certain example embodiments an apparatus can include means for initiating relative movement detection. The apparatus can also include means for reporting, to a base station, a location of the user equipment, based on the relative movement detection, for determination of a location of the base station.

The mechanism in certain example embodiments can combine various sources of information to determine the location of BTSs. The determined location information includes x, y and z axis information to serve various application needs, with accuracy and precision. For example, certain example embodiments can combine information from user equipment sensors' Inertial Measurement Unit (IMU) based on a Micro Electro-Mechanical System (MEMS) or the like. Initial position and orientation can be derived from prior sources, and subsequent positions, orientations, velocities, and directions can be updated via device to device (D2D) techniques with respect to the prior sources. For example, in certain example embodiments a combination of IMUs can be used, including an altimeter, gyroscope, barometer, accelerometer, and magnetometer. As users carry user equipment and walk in the floors of tall structure, it may be possible to determine the z axis information of the BTSs in which the user equipment is in range.

Other data can also be taken into account. For example, certain example embodiments can combine adjacent building information to derive x and y axis information.

Certain example embodiments use user equipment sensor information as an input to a continuous navigation algorithm to determine key internal BTS installation. Moreover, in certain example embodiments the indoor BTS or network can request user equipment to supply sensor data. The BTS or network can then use such provided sensor data to compute the location of the BTS.

Certain example embodiments can utilize a mechanism that can be used determined the height of a BTS with respect to other BTSs. The determination can be based on a principle that each BTS may be located in the ceiling of a floor of a building. Thus, the height of a BTS can be determined and/or reported as a discrete number corresponding to a number of floors of a building.

The location information that is learnt by network in certain example embodiments can be useful. For example, this location information can be supplied to other services such as SON, or machine-to-machine (M2M) device communication in the network.

FIG. 1 illustrates a network architecture according to certain example embodiments. FIG. 1 describes a typical scenario in which a macro BTS is providing umbrella coverage over a building. For the purposes of a simple illustration, the indoor environment in this case is a three story building, having at least one small cell BTS deployed on each floor. Each floor is partitioned into different regions or zones. Such partitioning may lead to needing more than one BTS to cover each floor.

In FIG. 1, on each floor there are shown two small cell BTSs: S1 and S4 in Floor 1, S2 and S5 in Floor 2, and S3 and S6 in Floor 3, respectively. Each of these small cell BTSs can illustrate particular wireless communication equipment including at least one antenna.

As can be seen from FIG. 1, users who are on Floor 2 adjacent to BTS S2 can be either wirelessly connected to BTS S2 or S3, but not in any other zone. Each of the neighbor BTS that are above one another have been grouped as a part of one group or zone.

A UE on each floor can wirelessly connect to a nearest BTS on that floor. The wireless connection and coverage of UEs can be done via SON algorithms. UEs of users who are on a current floor can wirelessly connect to the BTS that resides on that floor. In some cases, however, a building may not have a BTS on each floor. For example, a BTS may be deployed on odd or even numbered floors or once every few floors. In those cases, determination of the z axis may involve a two step process. In a first step, z axis information can be obtained from sensors. Subsequently, relative local signal strength computation can be done at, or with respect to, the inside BTSs. It may be assumed, for example, that UEs on a same floor as the BTS may, on average, receive the BTS signal with higher signal strength than UEs on adjacent or more distant floors.

Certain example embodiments address issues such as how to determine BTS height inside the building, such as the floor on which the BTS is installed. Additionally, certain example embodiments address issues such as on which floor the user is currently using the indoor systems. This information may be useful for emergency services.

In certain example embodiments, when a user moves into the building, the user can automatically wirelessly connect to a BTS that is close to the entrance of the building. For the purposes of illustration, in this case the user may initially be served by BTS S1 on Floor 1. The user may then move around the building to a different floor. Also, there may be a macro base station providing umbrella coverage for the building but this macro base station may not be used when the user is inside the building.

Figure 2:
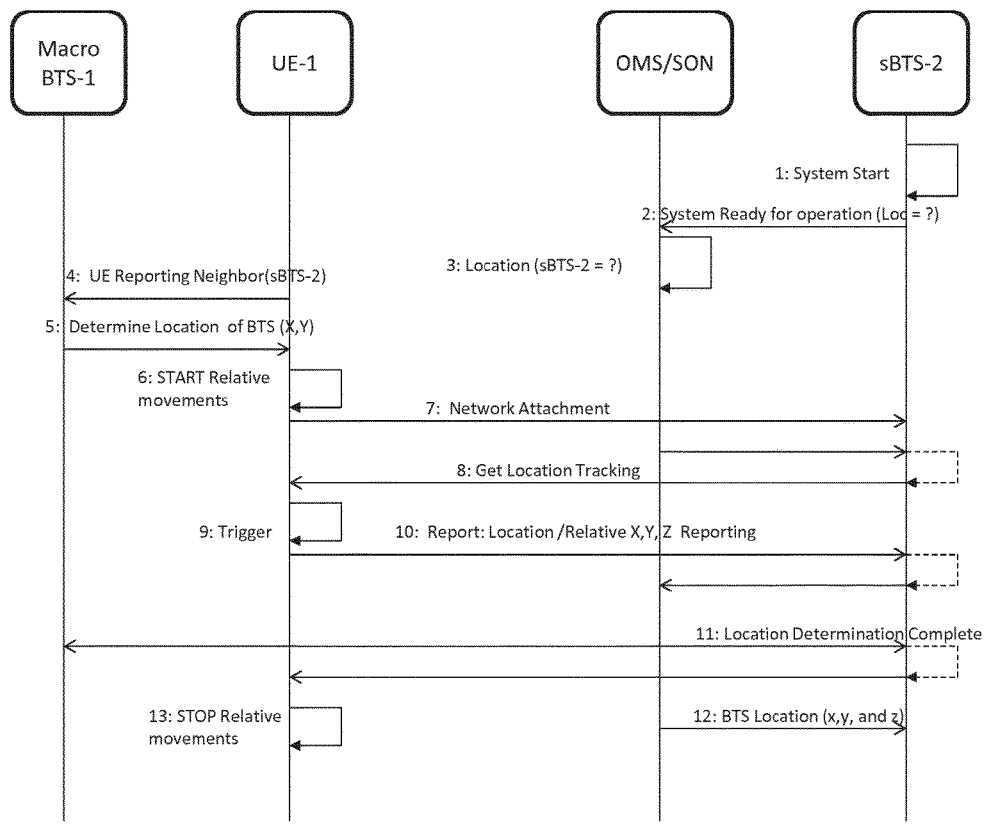
FIG. 2 illustrates a message sequence to determine x, y and z axis locations of indoor devices, according to certain example embodiments.

FIG. 2 illustrates a message sequence to determine x, y and z axis locations of indoor devices including BTSs and UEs, according to certain example embodiments. FIG. 2 describes the sequence of messages that may be performed in certain example embodiments to determine x, y and z axis locations of network elements in an indoor environment. In addition to x, y and z axis location of a BTS, the methods can also provide for localization of a particular UE inside the network.

As shown in FIG. 2, sBTS-2 is a small cell BTS that is inside a building and user equipment UE-1 is initially served by a macro BTS (Macro BTS-1) in an outdoor environment. Both sBTS-2 and BTS-1 are, in this example, being served, controlled, and managed by the same remote server, such as an operations administration and maintenance or SON (OMS/SON).

The remote management server can include many functions including, for example, location determination services. Alternatively, the remote management server may interface with a location server. For simplicity, the interface between the OMS/SON and location server is not shown in FIG. 2.

In the case illustrated FIG. 2, UE-1 can initially wirelessly connect to Macro BTS-1, and can enter a building, thereby entering a coverage area of sBTS-2.

The signal strength between the UE-1 and a small cell BTS can be inversely proportional to the distance between the UE-1 and the small cell BTS. Using the signal strength between UE-1 and a small cell BTS, a BTS, OMS/SON or a location server can perform a location based determination procedure to determine each small cell BTS location.

At 1, the small cell network can be started, particularly with respect to sBTS-2. As part of a startup sequence, sBTS-2 can internally check whether sBTS-2 knows its own location, as to the x, y and z axis. Since it is a fresh start, it may not know the values. After a successful start-up sequence, at 2, sBTS-2 can register itself with status stating that its location values needs to be determined.

It may be possible to get input x, y, z axis location as part of site configuration. However, such an approach may involve a service technician visiting the site and gather location planning information. The small cell BTS may use an external GPS antenna to synchronize the small cell BTS's internal clock. Nevertheless, such an antenna may be deployed in a way that is of limited relevance to the issues being addressed here—such as one antenna per building, on the top of the building. A separate cable can be used to connect each small cell BTS to the GPS antenna. In this environment, all small cell BTSs in the building will share the same x, y and z coordinates based on GPS.

A small cell BTS may be a fixed endpoint that does not move around once deployed. Nevertheless, the startup procedure described above can be done each start up time. The procedure can be part of bootstrapping of the network.

At 3, the remote management server, such as an OMS/SON, can internally mark that sBTS-2 needs its location to be determined.

When a user is about to enter the building, UE-1 which is currently wirelessly connected to Macro BTS-1 may come closer into proximity of sBTS-2. UE-1 can correspond, for example, to one of the numerous user equipment illustrated in FIG. 1. As UE-1 enters the building, UE-1 may start seeing sBTS-2 as a neighboring cell and consequently may report it to a BTS, the OMS/SON and/or a location server.

There are several ways or conditions under which the neighboring cell can be reported. When there is activity from the UE to the macro environment, such neighboring cell information can be sent out.

When a UE is wirelessly connected to current Macro BTS-1, the Macro BTS-1 may request as part of the initial configuration of cell parameters, the UE report any neighboring BTS that is discovered while moving, or the like. This procedure is not shown in FIG. 2, but may be present in certain example embodiments.

Just before entering the building or in close proximity to the building' entrance, UE-1 can receive signals from sBTS-2 and from Macro BTS-1. The OMS/SON, via the Macro BTS-1 can request, at reference number 5 in FIG. 2, the UE-1 to note UE-1's current location. UE-1 can also start relative movement tracking internally. As part of a bootstrap procedure, the following are possible scenarios that can arise.

There are several ways to determine the UE-1 location that is about to enter the building. When UE-1 receives the message at reference number 5 in FIG. 2, UE-1 can turn ON GPS and obtain x, y, and z axis information at UE-1's current location. After getting the location information, UE-1 can turn OFF GPS.

All small cell BTSs can send out, for example in a broadcast message, a location determination needed message. This message can be broadcasted until all the BTSs have learned their respective locations.

Any UE that is about to enter a particular building may receive signals from Macro BTS-1 and small cell BTSs, such as sBTS-2. Each UE can decode the small cell BTS broadcasted signal and learn that the UE is supposed to provide the UE's x, y and/or z axis coordinates. The UE can then turn on the UE's GPS and can collect the UE's x, y and/or z axis coordinates and supply the result to the BTS. This procedure may only need to be done for short time. The GPS can be used as jump-start procedure; the GPS can then be turned OFF. Alternatively, the GPS may already be on when the signals from the small cell BTSs are received and may remain on after the location data is provided.

It is also possible to do without GPS. For example, UE-1 can report to the macro BTS or the OMS/SON the signal strength of the small cell BTS that UE-1 is receiving. Then the macro BTS or OMS can perform a location based determination procedure to determine each small BTS location.

At 6, before UE-1 starts to wirelessly connect with sBTS-2, UE-1 can turn ON its MEMS sensors, such as gyroscope, accelerometer, and barometer. UE-1 can use the determined x, y and z axis location determined at reference number 5 in FIG. 2 to calculate relative x, y and z axis movements. Thus, the relative movements can be computed from the MEMS sensor movements made since the initial x, y and z axis location of the UE was determined when the user entered the building.

At 7, when UE-1 comes sufficiently near the sBTS-2, UE-1 can wirelessly connect to sBTS-2. After connecting to sBTS-2, a BTS, the OMS/SON or a location server can request at 8 to get a current location of x, y and z axis location of UE-1, which can be based on the initial position and relative measurements.

When the request is being made, a BTS, the OMS/SON or a location server can supply a location configuration profile (LCP). The LCP can include a frequency of update that is to be performed by UE-1 to report the UE's location. In addition, or alternatively, when the UE-1 moves and the UE's relative distance in any or a combination of x, y and z is more than a certain predetermined distance, UE-1 can report UE-1's location.

Figure 3:
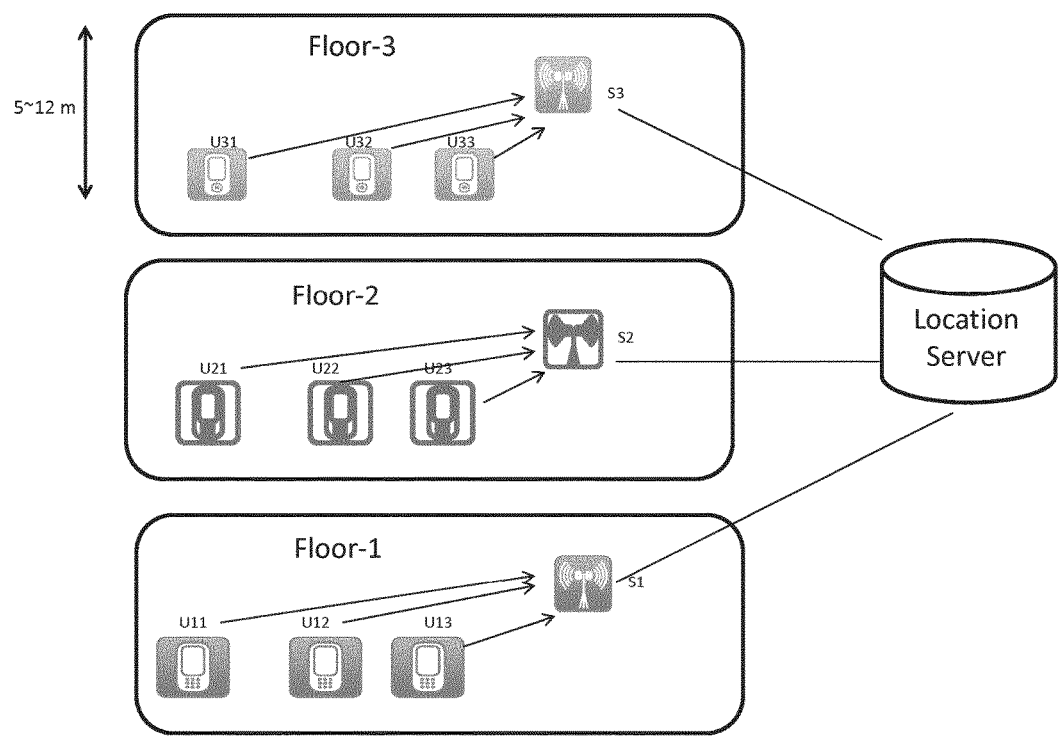
FIG. 3 provides alternative view of the indoors of a building, according to certain example embodiments.

FIG. 3 provides alternative view of the indoors of a building, according to certain example embodiments. As shown in FIG. 3, there can be three small cell BTSs, namely S1, S2 and S3, respectively fitted for Floors 1, 2 and 3. A UE arriving to the building may wirelessly connect to the Floor-1 BTS S1 as the user enters the building entrance. For instance, UE11, UE12 and UE13 may enter the building and report the wireless specific parameters such as signal strength between each UE and each small cell BTS and respective x, y and z location. FIG. 4 provides an example of a table of data based on reports from UEs, according to certain example embodiments. Note there may not be much variation in z axis information, especially relative to variation in x axis and y axis information.

FIG. 3 illustrates each UE as reporting to a nearest BTS in Floor 1. Nevertheless, the information that UE provides to a current BTS may not only include the S1 specific wireless parameters, but may even include each of the neighboring BTSs including S2, and S3 and their respective signal strengths between the UE and the neighboring BTSs.

As shown in FIG. 4, UE11 can receive signals from S1, S2 and S3. UE11 can report wireless specific signal information that UE11 sampled, at a given location x, y and z to a BTS, a remote management server (such as an OMS/SON), and/or a location server. The BTS, OMS/SON and/or location server can maintain the data points. When a user moves from one floor to another floor, for example from Floor-1 to Floor-2, the signal strength from each BTS changes. Nevertheless, the UE may still be allowed to continue to be connected to the previous floor BTS, for example the BTS on Floor-1.

As mentioned above, a BTS may not be installed on every floor, but may be installed on, for example, an odd number of floors. The geometrical deployment and their relative locations can be stored in a BTS, OMS/SON or a location server. With this stored information, and reported signal strength (between a UE and a BTS) from each UE, the respective floor level can be determined.

Thus, in certain example embodiments each UE can report the UE's x, y, and z relative computed location. The information reported can include a list of small cell BTSs that UE-1 is able to notice, as well as wireless specific parameters, with sampled location points, which can include x, y and z information. In FIG. 4, in the first three rows, UE11 reports UE11's location and respective signal strength values that it sees.

As shown in FIG. 2, UE-1 can continuously act on the LCP configuration information received at 8 and can computes x, y and z information based on MEMS sensory inputs. When a trigger condition is met at 9, UE-1 can prepare a sample of data.

UE-1 can be moving freely in the x or y axis while staying in same floor and moving within the coverage BTS. Alternatively, UE-1 can be moving from Floor-1 to Floor-2 or Floor-3 or any combination. It may be possible that there is a variation is in z axis location, which may be determined by an atmospheric pressure sensor. The accuracy may be 5 m to 10 meter variation in pressure, provided by a pressure sensor to determine the exact floor level location. This discrete value may be determinable with respect to the z axis when combined with each BTS signal strength information.

For example, while on Floor-1, the current z axis location of UE-1 can be determined by its atmospheric pressure sensor. The signal strength between UE-1 and a BTS on Floor-1 is noted. The user of UE-1 moves directly up to Floor-2 (without changing its x and y axis location). While on Floor-2, the current z axis location of UE-1 is determined by its atmospheric pressure sensor. The signal strength between UE-1 and a BTS on Floor-2 is also noted. If the signal strength between UE-1 and the first BTS is the same as the signal strength between the UE-1 and the second BTS, it can be determined that the z axis location of the second BTS is the same as the current z axis location of the UE-1 on Floor-2.

As shown in FIG. 1, when a user moves on the same floor but from Zone1 to Zone2, then the computed x, y axis can be given to the small cell BTS S4 or any other small cell BTS in Zone2. This way each BTS can know the BTS's floor x, y axis coverage area for a given power level. This process can be repeated as part of commissioning and operations.

Again as shown in FIG. 1, when the user moves from Floor 1 to Floor 2, for example by walking through the steps or elevator or escalator, the UE can detect change in coverage from a small cell BTS on Floor 1 to a small cell BTS on Floor 2, and note the BTS Identification (BTS ID) of the small cell BTS on Floor 2, signal strength from nearby BTSs, for example as part of a handover procedure. The UE traffic can now be routed via the small cell BTS on Floor 2. For example, for a UE that is wirelessly connected to small cell BTS S1, when a user of the UE moves to Floor 2, the UE wirelessly connects to S2 on Floor 2. The current x, y and z axis location of the UE can now be reported to S2. This way both S1 and S2 small cell BTSs can learn their respective locations. For example, each UE can report a small cell BTS neighbor list and the relative and computed x y and z axis location along with signal strength or other housekeeping information.

As the signal strength between a UE and a BTS is inversely proportional to the location of the UE and the BTS, the following examples can show how the x and y axis location of a BTS can be determined. For example, a scenario can be considered in which a user of UE-1 is traversing Floor 1 (the ground floor) to the top of floor, Floor N. Normally, UE-1 receives signal strength from its nearby BTS. It can be internally stored as a vector such as at Time t1—Floor 1, SS1 (Signal Strength value 1), Floor 2, SS2, and so on up to Floor N, SSn. The signal strength can be sampled at certain intervals and can be stored internally. To determine the nearest BTS, while on Floor 1, the signal strength between UE-1 and a BTS can be noted, along with the x and y axis location of UE-1. The user of UE-1 can move directly up to Floor-2 (without changing its x and y axis location). While on Floor 2, the signal strength between UE-1 and a BTS on Floor-2 can also be noted. If the signal strength between UE-1 and the first BTS on Floor-1 is the same as the signal strength between the UE-1 and the second BTS on Floor-2, it can be determined that the x and y location of the first BTS is the same as the x and y location of the second BTS. When the UE-1 moves up, variations on received signal strength from all BTS can be observed by the UE-1. Since the user is going to stop or walk at discrete floors, and when the UE-1 has reached Floor 2, the sampled signal strength between the BTS on Floor 2 and UE-1 can be the same as the signal strength previously observed by UE-1 when it moved up the floors. Accordingly, based on the signal strength between UE-1 and a BTS, the UE-1 can determine the relative position of itself with respect to a BTS. Similarly, based on the signal strength between UE-1 and a BTS, the BTS can determine the relative position of itself with respect to UE-1.

As mentioned above, there may not be a BTS on every floor. Nevertheless, even when there is one or more BTS on each floor, traffic optimization may be enabled via SON. Thus, a greater number of BTSs may be covering certain floor(s) inside a building to distribute the load among the indoor BTSs. Such features may be activated when, for instance, floors 1 to 3 have more users than floors 4 to 10 in a 10 floor building.

In certain example embodiments, therefore, the BTSs on floors 4 to 10 may be powered up in such a way as to serve users in floors 1 to 3. Under this traffic load balancing, additional metrics can be collected, and computed to determine the actual floor location.

Because radio signal strength may vary a lot in an indoor environment, computed x and y axis location from MEMS sensors can be associated with BTS ID, along with z axis information, to associate the location of the UE with the BTS having the BTS ID.

At 10, UE-1 can report sampled location to SBTS-2, which can be sent to a BTS, the OMS/SON or a location server for storage.

At 11, after the BTS, OMS/SON and/or location server have sufficiently learned from UE relative location movements inside the building, steps 4 and 10 may no longer be needed. For example, if the BTS learns the BTS's own location upon first start, during subsequent restarts, the BTS can simply determine the BTS's own location from a previous stored value.

At 11, the learning, by the BTS, OMS/SON and/or location server, of the UE relative location movements can include machine learning. Machine learning can be done in various ways. For example, the sample location and any newly reported location can be checked periodically. One approach is to form a Convex operation. Thus, each initially reported location(s) can be mapped to form a closed contour. When any location is reported, the reported location can be noted as part of closed contour. The contour location map can be formed inside the contour. When any new location is reported that is outside of the formed contour, the contour area can be expanded. When no new location is reported that is outside of the contour for some predetermined amount of time or predetermined amount of reports, then learning can be stopped. This step can be performed with few UEs or as part after commissioning.

In certain example embodiments, an approach for quick learning may involve a janitor. For example, the person(s) who is doing the floor cleaning service can carry out these cleaning duties in the late evening or night. While the janitor is performing vacuuming, the janitor's phone can learn all the possible locations and report the values. In this way the location of possible user movements can be learned cleanly in lightly loaded conditions. The learned information can and this will be applied when the user is actually using the systems. Thus, in certain example embodiments one, or a few selected users, can act as volunteers to make the system to learn in systematic manner.

In certain example embodiments, indoor building pressure and temperature will remain invariant from floor to floor. This may be due to a building design that maintains pressure and temperature the same for all floors. In such a case, the UE based temperature or pressure sensor may not be accurate. When the variation is not much, then a signal strength based scheme can be used. Alternatively, both signal strength and other sensors can be used in combination.

In certain example embodiments, while training using janitorial staff, network features such as load balancing, traffic optimization, and the like, can be disabled. Limiting the use of such features during location training can help to determine the location of UE, and also to permit quick construction of maps using few persons. This approach can also enhance the location privacy of ordinary users, by not requiring involuntary assistance in making the location determination of the BTS.

Once location determination is complete at 11, the BTS can stop broadcasting to the UEs the location determination needed message. Also, the BTS can send out a location determination not needed message to the UEs. Upon receiving such a message, or upon failing to receive the location determination needed message, all UEs can turn off their respective relative x and y axis location computation.

At 12, the remote server can send the BTS location determined from previous steps via the OMS/SON. Furthermore, at 13, the application on UE-1 can stop the sensor activity on that phone.

As described above, in certain example embodiments relative x, y and z axis information can be calculated from user equipment. The use of zones can serve to identify the location of users within the BTS, or network, coverage area. This accuracy be configured to meet a standard for emergency services.

The steps described in FIG. 2 can be repeated during the initial time. The results can be stored internally inside a BTS, OMS/SON and/or a location server. Later, this information can be used to determine the UE location including z axis.

Precision and/or accuracy of a system in certain example embodiments can vary. For example, certain example embodiments can determine z axis or floor information of the BTS, as well as that of a UE.

Altimeter readings of UEs, such as those in FIG. 1, can be increasing as elevation increases and can be associated directly. Each floor can be assumed to be 8 to 14 feet height. An altimeter reading can be used to determine the floor level. For example, S1 and S4 may report approximately same value in their altimeter readings. Similarly, S2 and S5 can report similar views to one another, as can S3 and S6. There may be a difference of 8 to 14 feet between altimeter readings from S1, S2 and S3. Thus, the system can determine that S1, S2 and S3 are at different floors, by grouping reports within a similar range. The same can be followed for S4, S5 and S6. Since the floors are at fixed height, even if the altimeter has poor accuracy due to an offset, the offset can be a discrete value. With this approach, the user floor location in the z axis may be determinable. In addition, since users may normally carry their devices at least a foot above the floor and at least a foot below the ceiling, the actual variation in height amongst devices on a same floor may be even less than 8 to 14 feet, providing a greater separation between devices on different floors.

Combining z axis and computed x, y axis location can provide the accuracy desired for support of emergency and localized application services. Such accuracy may be, for example, 5 meter accuracy.

Figure 5:
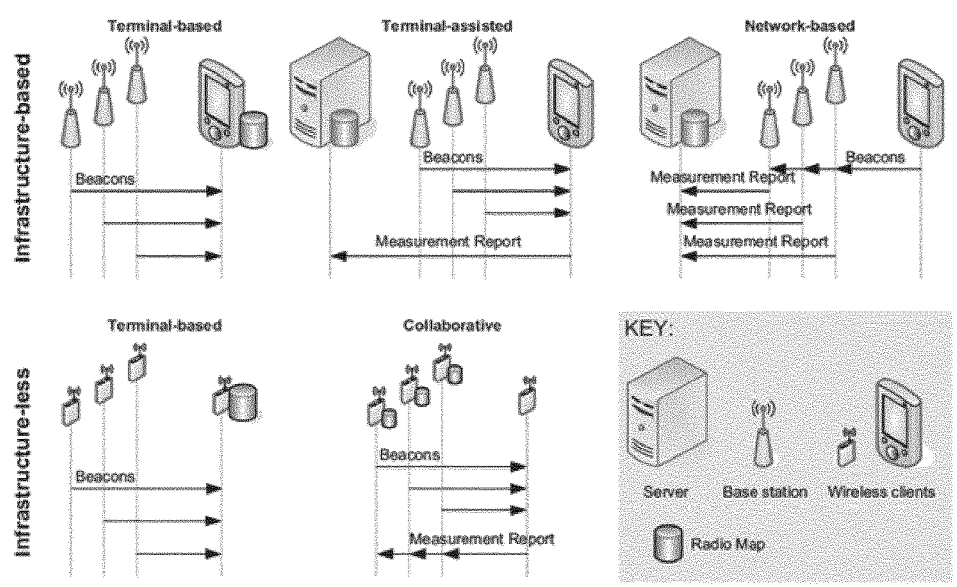
FIG. 5 illustrates various assignments of responsibilities in various location techniques.

FIG. 5 illustrates various assignments of responsibilities in various location techniques. As shown in FIG. 5, there can be infrastructure-based and infrastructure-less techniques. Both infrastructure-based and infrastructure-less techniques can have a version that is terminal-based. In addition, the infrastructure-based approaches can be either terminal assisted or network-based. Likewise, the infrastructure-less approaches can also include a collaborative approach.

Figure 6:
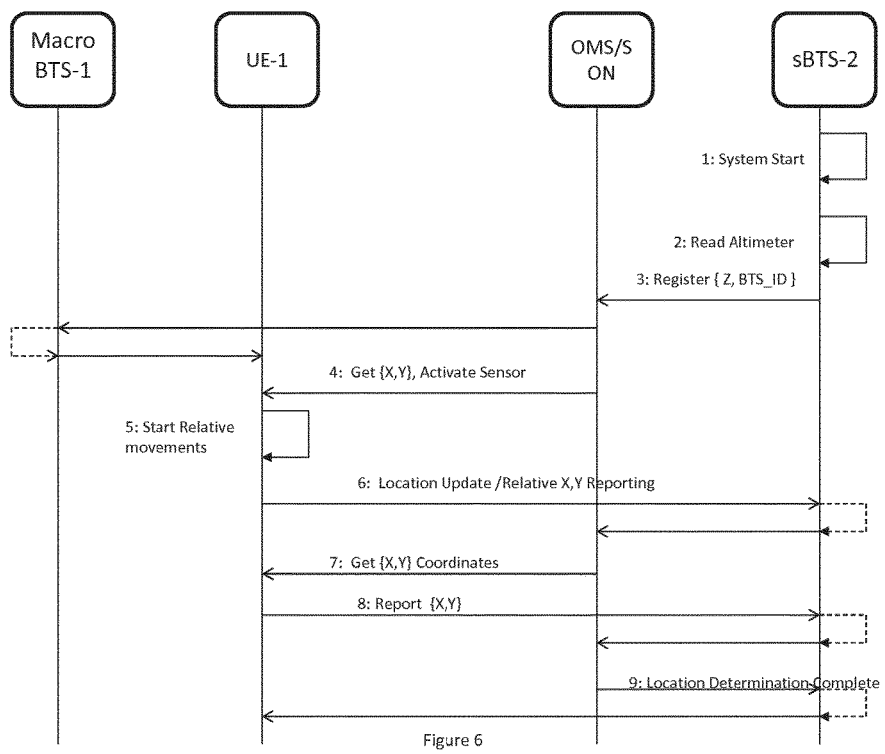
FIG. 6 illustrates an alternative approach to location determination, according to certain example embodiments.

FIG. 6 illustrates an alternative approach to location determination, according to certain example embodiments. As shown in FIG. 6, the approach of FIG. 6 can differ from that of FIG. 2 in that a small cell BTS, sBTS-2, can initially determine its own altitude from an altimeter, at 2, and can provide this information with its own ID at 3. Then, UE-1 may not need to make any z axis location determinations. For example, the small cell BTS can be equipped with altimeter that can either be integrated with the hardware or attached via a MEMS plug-in module externally. In either case, the small cell BTS can otherwise start up normally.

Figure 7:
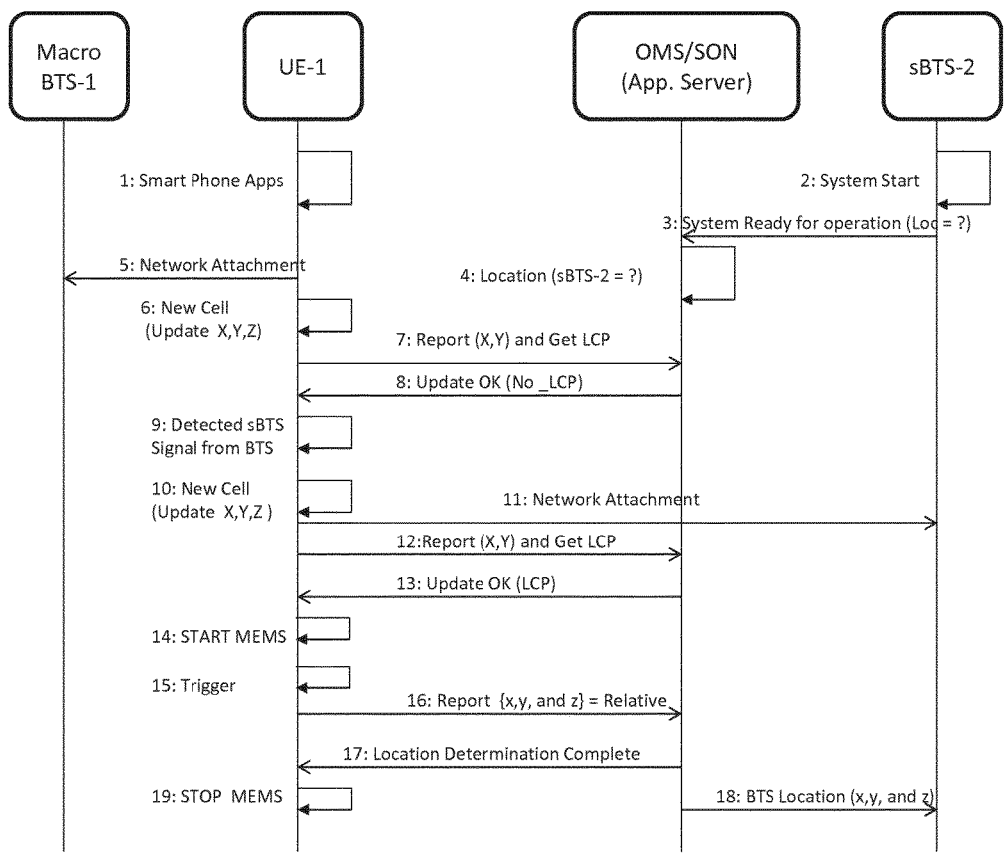
FIG. 7 illustrates a further alternative approach to location determination, according to certain example embodiments.

FIG. 7 illustrates a further alternative approach to location determination, according to certain example embodiments. As shown in FIG. 7, the approach of FIG. 7 can differ from that of FIG. 2 in that the approach shown in FIG. 7 can be more proactive with respect to UE-1 automatically reporting x and y axis location measurements upon wirelessly connecting to sBTS-2. Additionally, the connection between OMS/SON is not shown through sBTS-2, although in practice, UE-1 may connect to OMS/SON via sBTS-2 when wirelessly connected to sBTS-2.

For example, in FIG. 7, at 7 UE-1 can report x and y axis location and request an LCP. If no LCP is available at 8, then the UE-1 need not take further action. If, however, in response to an analogous report at 12, UE-1 receives an LCP at 13, then the UE-1 can start its sensor(s) at 14 and, at 15, trigger reporting in accordance with the LCP. At 16, UE-1 can report x, y, and z relative information. This reporting can continue until, at 17, UE-1 receives a location determination complete message.

Figure 8:
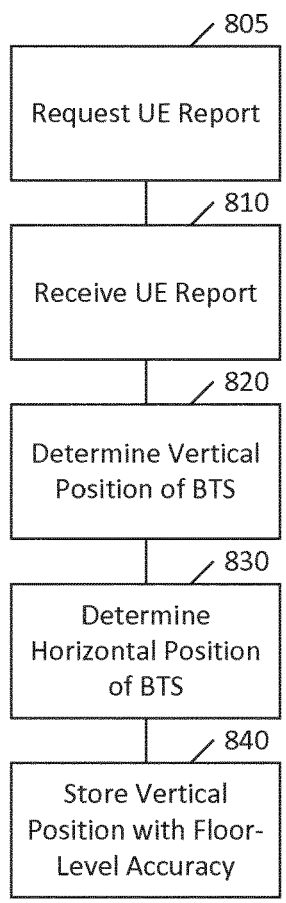
FIG. 8 illustrates a method according to certain example embodiments.

FIG. 8 illustrates a method according to certain example embodiments. The method of FIG. 8 may be implemented by a processor, such as the processor of a base station.

As shown in FIG. 8, the method can include, at 810, receiving from at least one user equipment, at least one report based on at least a signal strength of a wireless connection between the at least one user equipment and the base station.

The method can also include, at 820, determining a vertical position of the base station, from the at least one report. The method can additionally include, at 830, determining a horizontal position of the base station from the at least one report from the at least one user equipment. The horizontal position here can refer to a coverage area of the base station, without necessarily referring to the particular position of the base station within, or at the edge of, that coverage area.

The vertical position can be determined based on user equipment sensor data. For example, a user equipment can be equipped with an altimeter or other MEMS sensors.

The determining the vertical position can include determining a relative position of the base station with respect to another base station. For example, determining the vertical position can include determining that the base station is on the same floor as, or on a different floor than, the other base station.

The determining the vertical position can be performed to a floor-level accuracy. Floor level accuracy can be the accuracy necessary to distinguish amongst floors. For example, a typical story can be 8 to 14 feet. Thus, 3-5 meter accuracy may be an example of a range of floor-level accuracies.

The method can further include, at 840, storing the vertical position. The vertical position can be stored with floor level precision. For example, the vertical position can be stored as a floor number, such as "first floor," or "1," or the like.

The method may optionally include, at 805, requesting the at least one report by sending a location determination needed message. Thus, the base station can trigger the sending of these reports from one or more UEs. The base station can perform this request upon a first start up, or alternatively any time a nearby base station has a first start up.

Figure 9:
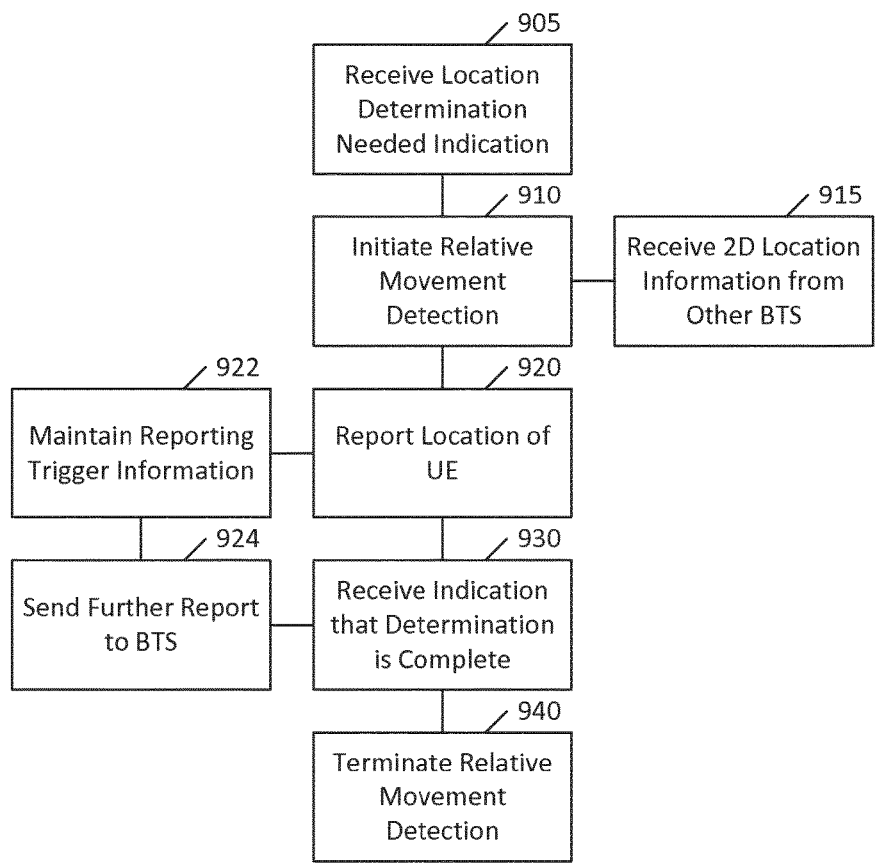
FIG. 9 illustrates another method according to certain example embodiments.

FIG. 9 illustrates another method according to certain example embodiments. The method of FIG. 9 may be implemented by a processor of a user equipment. The method can include, at 910, initiating relative movement detection. The method can also include, at 920, reporting, to a base station, a location of the user equipment, based on the relative movement detection, for determination of a location of the base station.

The method can further include, at 930, receiving an indication from the base station that the determination of the base station is complete. The method can additionally include, at 940, terminating the relative movement detection in response to the indication.

The report to the base station can include three-dimensional location information. Alternatively, the report can include two-dimensional or one-dimensional information. The report can include signal strength information regarding any base stations with which the user equipment can wirelessly communicate.

The method can optionally include, at 915, receiving two-dimensional location information from another base station. The three-dimensional location information can be based on the two-dimensional location information.

The method can optionally include, at 905, receiving an indication from the base station that determination of the location is needed. The initiation of relative movement detection can be responsive to the indication.

The method can optionally include, at 922, maintaining information regarding a reporting trigger with respect to the relative movement detection. The method can further include, at 924, sending a further report to the base station when the reporting trigger is met.

Figure 10:
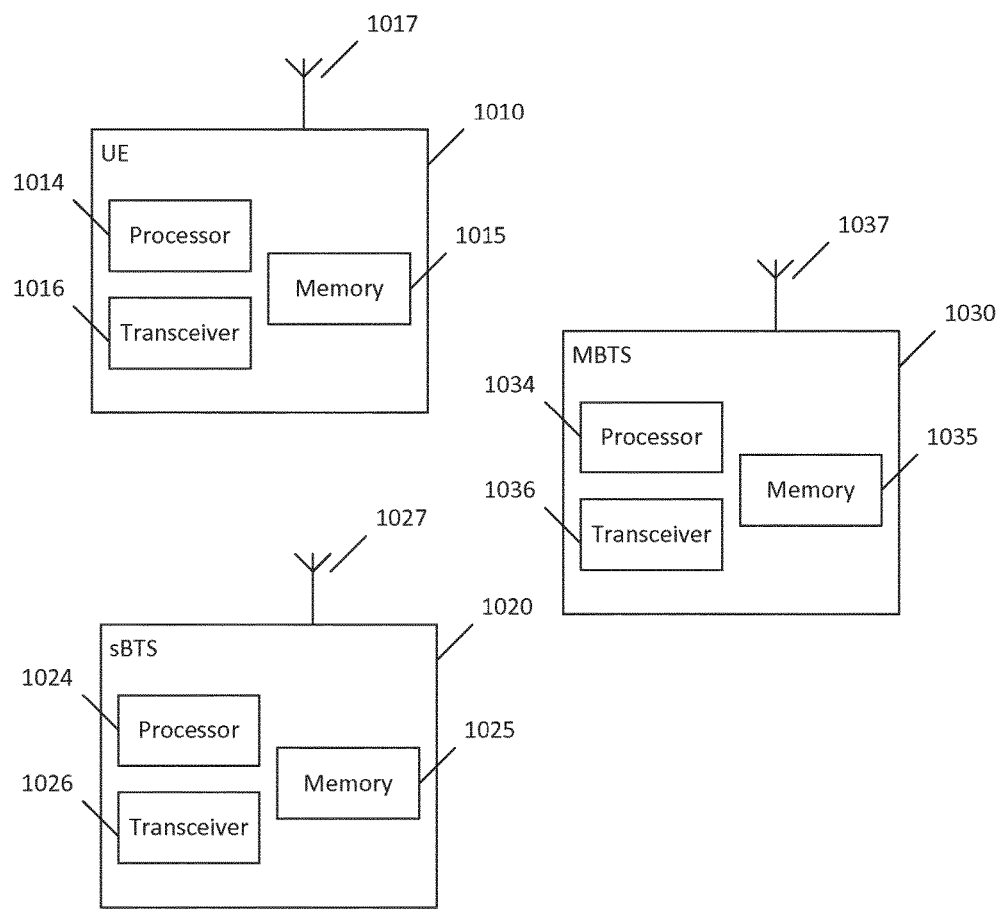
FIG. 10 illustrates a system according to certain example embodiments.

FIG. 10 illustrates a system according to certain example embodiments of the invention. In one example embodiment, a system may include multiple devices, such as, for example, at least one UE 1010, at least one small cell BTS 1020 or other base station or access point, and at least one macro BTS 1030 or other base station or access point. In example embodiments, processors of the UE 1010, small cell BTS 1020 and macro BTS 1030 can be configured to implement the methods shown in the figures and disclosed herein. There can also be additional network elements, such as are illustrated in the other figures. Those network elements may have a similar construction to what is described with respect to the devices illustrated in this figure.

Each of these devices may include at least one processor, respectively indicated as 1014, 1024, and 1034. At least one memory can be provided in each device, and indicated as 1015, 1025, and 1035, respectively. The memory may include computer program instructions or computer code contained therein. The processors 1014, 1024, and 1034 and memories 1015, 1025, and 1035, or a subset thereof, can be configured to provide means corresponding to the various blocks of FIGS. 8 and/or 9.

As shown in FIG. 10, transceivers 1016, 1026, and 1036 can be provided, and each device may also include an antenna, respectively illustrated as 1017, 1027, and 1037. Other configurations of these devices, for example, may be provided. For example, MBTS 1030 may be configured for wired communication, in addition to wireless communication, and in such a case antenna 1037 can illustrate any form of communication hardware, without requiring a conventional antenna.

Transceivers 1016, 1026, and 1036 can each, independently, be a transmitter, a receiver, or both a transmitter and a receiver, or a unit or device that is configured both for transmission and reception.

Processors 1014, 1024, and 1034 can be embodied by any computational or data processing device, such as a central processing unit (CPU), application specific integrated circuit (ASIC), or comparable device. The processors can be implemented as a single controller, or a plurality of controllers or processors.

Memories 1015, 1025, and 1035 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1010, small cell BTS 1020, and macro BTS 1030, to perform any of the processes described herein (see, for example, FIGS. 2 and 6 through 8). Therefore, in certain example embodiments, a non-transitory computer-readable medium can be encoded with computer instructions that, when executed in hardware, perform a process such as one of the processes described herein. Alternatively, certain example embodiments of the invention can be performed entirely in hardware.

Furthermore, although FIG. 10 illustrates a system including a UE, small cell BTS, and a macro BTS, example embodiments of the invention may be applicable to other configurations, and configurations involving additional elements. For example, not shown, additional UEs may be present, and additional core network elements may be present.

Certain example embodiments may have various advantages and/or benefits. For example, certain network-based methods can determine x, y and z locations of UEs and BTSs in an indoor environment. Furthermore, certain example embodiments can provide a method that converges quickly and can be used as part of provisioning and commissioning of systems or after each BTS restart. Additionally, certain example embodiments can be part of SON operation, and can coordinate with an existing SON framework. Certain example embodiments are also deterministic and can provide the accuracy appropriate for emergency services.

Although the above example embodiments have been described in terms of a building, other indoor environments are also permitted. For example, certain example embodiments can be implemented in a cave or similar scenario such as, for example, a subway station or system. In such cases, the top floor may be the first place where a transition is made from GPS to alternative location techniques by user equipment entering the subway system.

One having ordinary skill in the art will readily understand that the invention as discussed above may be practiced with steps in a different order, and/or with hardware elements in configurations which are different than those which are disclosed. Therefore, although the invention has been described based upon these preferred example embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method implemented by a processor of a macro base station, comprising:
   receiving from a user equipment, a report of a first location of the user equipment in an outdoor environment;
   after the user equipment makes a wireless connection with a small cell base station that is located in an indoor environment, receiving another report of a second location of the user equipment and a signal strength of the wireless connection between the user equipment and the small cell base station at the second location; and
   determining by the processor of the macro base station a vertical position of the small cell base station based on the first location and the signal strength of the wireless connection between the user equipment and the small cell base station at the second location.

2. The method of claim 1, further comprising:
   determining a horizontal position of the small cell base station from at least one of the report or the another report from the user equipment.

3. The method of claim 1, wherein the vertical position is determined based on sensor data of the user equipment.

4. The method of claim 1, wherein the determining of the vertical position further comprises determining a relative position of the small cell base station with respect to another base station.

5. The method of claim 1, wherein the determining of the vertical position is performed to a floor-level accuracy.

6. The method of claim 1, further comprising:
storing the vertical position, wherein the vertical position is stored with floor level precision.

7. The method of claim 1, further comprising:
requesting at least one of the report or the another report by sending a location determination needed message.

8. A method implemented by a processor of a user equipment, comprising:
initiating relative movement detection, the relative movement detection comprising:
reporting by the user equipment to a macro base station, a first location of the user equipment in an outdoor environment;
wirelessly connecting with a small cell base station that is located in an indoor environment; and
reporting, to the macro base station, a second location of the user equipment, and signal strength information regarding the small cell base station at the second location, for determination by the macro base station a location of the small cell base station, wherein the determination is based on the first location and the signal strength information between the user equipment and the small cell base station at the second location.

9. The method of claim 8, further comprising:
receiving an indication from the macro base station that the determination of the location of the small cell base station is complete; and
terminating the relative movement detection in response to the indication.

10. The method of claim 8, wherein the report to the macro base station includes three-dimensional location information.

11. The method of claim 10, further comprising:
receiving two-dimensional location information from another base station, wherein the three-dimensional location information reported to the macro base station is based on the two-dimensional location information.

12. The method of claim 8, further comprising:
receiving an indication from the macro base station that determination of the small cell base station location is needed, wherein the initiation of relative movement detection is responsive to the indication.

13. The method of claim 8, further comprising:
maintaining information regarding a reporting trigger with respect to the relative movement detection; and
sending a further report to the base station when the reporting trigger is met.

14. An apparatus, comprising:
at least one processor; and
at least one memory including computer program code,
wherein the at least one memory and the computer program code are configured to, with the at least one processor, cause a macro base station at least to:
receive from a user equipment, a report of a first location of the user equipment in an outdoor environment;
after the user equipment makes a wireless connection with a small cell base station that is located in an indoor environment, receive another report of a second location of the user equipment and a signal strength of the wireless connection between the user equipment and the small cell base station at the second location; and
determine by the at least one processor of the apparatus a vertical position of the small cell base station, from the at least one report based on the first location and the signal strength of the wireless connection between the user equipment and the small cell base station at the second location.

15. The apparatus of claim 14, wherein the at least one memory and the computer program code are configured to, with the at least one processor, cause the macro base station at least to determine a horizontal position of the small cell base station from at least one of the report of the first location or the another report of the second location from the user equipment.

16. The apparatus of claim 14, wherein the vertical position is determined based on user equipment sensor data.

17. The apparatus of claim 14, wherein the at least one memory and the computer program code are configured to, with the at least one processor, cause the macro base station at least to determine the vertical position by determining a relative position of the small cell base station with respect to another base station.

18. The apparatus of claim 14, wherein the at least one memory and the computer program code are configured to, with the at least one processor, cause the macro base station at least to determine the vertical position to a floor-level accuracy.

19. The apparatus of claim 14, wherein the at least one memory and the computer program code are configured to, with the at least one processor, cause the macro base station at least to store the vertical position with floor level precision.

20. The apparatus of claim 14, wherein the at least one memory and the computer program code are configured to, with the at least one processor, cause the macro base station at least to request at least one of the report of the first location or the another report of the second location by sending a location determination needed message.

* * * * *